United States Patent
Tramontano et al.

(10) Patent No.: US 7,577,613 B2
(45) Date of Patent: Aug. 18, 2009

(54) PROVISION OF RECEIPTS FOR SELF SERVICE OR POINT OF SALE TERMINALS

(75) Inventors: Robert J. Tramontano, Dayton, OH (US); Dennis J. Bellucci, Livermore, CA (US)

(73) Assignee: NCR Corporation, Dayton, OH (US)

( * ) Notice: Subject to any disclaimer, the term of this patent is extended or adjusted under 35 U.S.C. 154(b) by 1074 days.

(21) Appl. No.: 10/717,883

(22) Filed: Nov. 20, 2003

(65) Prior Publication Data
US 2005/0114215 A1 May 26, 2005

(51) Int. Cl.
*G06Q 30/00* (2006.01)
(52) U.S. Cl. .......................... 705/43; 902/36
(58) Field of Classification Search ............ 705/16–17, 705/21, 39–45; 902/8–22, 30, 36; 235/1 R, 235/2–5; 725/5
See application file for complete search history.

(56) References Cited

U.S. PATENT DOCUMENTS

| 5,910,988 | A | | 6/1999 | Ballard |
| 5,991,749 | A | * | 11/1999 | Morrill, Jr. .................... 705/44 |
| 6,574,377 | B1 | * | 6/2003 | Cahill et al. ................. 382/305 |
| 7,069,240 | B2 | * | 6/2006 | Spero et al. .................... 705/30 |
| 7,299,970 | B1 | * | 11/2007 | Ching ......................... 235/375 |
| 2003/0116621 | A1 | * | 6/2003 | Duncan ....................... 235/379 |
| 2003/0217005 | A1 | | 11/2003 | Drummond et al. |
| 2004/0064373 | A1 | * | 4/2004 | Shannon ....................... 705/24 |
| 2004/0098664 | A1 | * | 5/2004 | Adelman et al. ............. 715/500 |
| 2004/0225567 | A1 | | 11/2004 | Mitchell et al. |

FOREIGN PATENT DOCUMENTS

GB 2 358 723 A 8/2001

OTHER PUBLICATIONS

Alexander, "Holidays Bringing Out Credit-Card Thieves", Knight Ridder Tribune Business News, Nov. 29, 2009, p. 1.*
Patent Abstracts of Japan, vol. 2003, No. 7, Jul. 3, 2003 & JP 2003077064 A (Toshiba Tec Cor), Mar. 14, 2003.

* cited by examiner

*Primary Examiner*—Mary Cheung
(74) *Attorney, Agent, or Firm*—Gregory A. Welte

(57) ABSTRACT

A system and method for providing a receipt (20) to a user involving receiving at a host terminal receipt information from a point of sale or self-service terminal, and using this to create an image of a receipt (20). This can be done in any suitable image format or layout. The receipt image (20) is then included in a customer bank or account statement (18), together with conventional statement information (22).

15 Claims, 3 Drawing Sheets

FIG. 4

ACCOUNT NAME: M C SHOPPER
ACCOUNT NUMBER: 012345678

STATEMENT

| DATE | LOCATION | AMOUNT |
|------|----------|--------|
| 1/2/03 | BANK X ATM | £10 |
| 2/2/03 | FOOD SHOP | £15.63 |

RECEIPTS

BANK X

ACCOUNT NO: 012345678
DATE: 1/2/03
TIME: 13.25
LOCATION: DUNDEE
AMOUNT: £10

FOOD SHOP

DATE: 2/2/2003
10 ORGANIC APPLES: £2.80
2KG POTATOES: £2.40
500G GRN BEANS: £1.99
2LB LEAN MINCE: £3.50
BOTTLE WHITE WINE: £4.94

TOTAL: £15.63

PROVISION OF RECEIPTS FOR SELF SERVICE OR POINT OF SALE TERMINALS

BACKGROUND OF THE INVENTION

The present invention relates to a system and method for providing receipts bearing financial/transactional information to users of self-service or point of sale terminals, and in particular automatic teller machines.

Self-service terminals such as automatic teller machines (ATMs) currently allow users to carry out financial transactions and optionally receive a receipt confirming details of the transaction. FIG. 1 shows the steps that are typically taken when a transaction occurs in a financial network. Firstly, the consumer enters into the ATM transaction data, such as the amount of money he wants to withdraw. This is then processed, typically with reference to a host terminal. If the transaction is a point of sale transaction, an electronic signature may be captured.

Once the transaction is authorized by the host and completed, a transactional receipt is printed by the ATM or POS terminal and issued to the consumer. This receipt typically includes a detailed breakdown of the transaction. For example, for an ATM, the receipt usually includes details of the amount withdrawn, the date, the time, the location of the ATM, the account number, etc. For a point of sales transaction, the receipt typically includes an identifier for identifying each of the goods purchased as well as the price. Some high level details of the transaction, such as the total amount spent/withdrawn, the date and the location of the ATM or POS, are then transmitted to the host terminal, where they are stored. This stored information is then used by the bank and printed in a listing that constitutes the customer's monthly statement.

Whilst printing and issuing receipts at a self service terminal gives a useful record of any transactions carried out at that terminal, it can be inconvenient, because it means that customers have to retain relatively small bits of paper for later use. When the customer has to collect many of these receipts, keeping track of them can become troublesome. Another problem with issuing receipts at ATMs is the need to provide printers and paper in the ATM itself. This increases the overall cost and technical complexity of these machines. A yet further difficulty is that printing out receipts can cause litter problems in the vicinity of ATMs, because customers often forget to take their receipt or they check it and then discard it. Even though bins are usually provided for unwanted receipts, these can overflow. Emptying the bins can add a maintenance burden.

SUMMARY OF THE INVENTION

An object of the present invention is to provide an improved mechanism for providing users with receipts for transactions that are carried out at a point of sale or self-service terminal, and in particular an ATM.

According to one aspect of the present invention, there is provided a method for providing a receipt confirming the details of some form of financial transaction to a user comprising:

receiving at a host terminal receipt information from a point of sale or self service terminal;

creating an image of a receipt using the receipt information, and including the receipt image in a customer bank or account statement.

By including an image of a transaction receipt in the customer's account, the need to print and issue receipts at the point of sale terminal or ATM is avoided. This is convenient for the customer.

Preferably, the method involves including the receipt information in a receipt template. This template may have a form or layout that is determined by the issuer of the receipt information. For example, some department stores may have a preferred receipt image layout with branding thereon, in which case the receipt template may be such that the receipt image for that store may be presented in that pre-determined format.

Preferably, the method further involves storing the template or form at the point of sale or self-service terminal, and sending the receipt information in or with the template to the host terminal.

Alternatively, the method may involve storing the template or form at the host terminal, and using the receipt information and the template or form to create the receipt image. In practice, a plurality of templates may be stored at the host terminal and the method may further involve identifying the receipt issuing party; searching for the template associated with that party, and using the template found to create the receipt image.

According to another aspect of the invention there is provided a system for providing a receipt to a user, the system being configured to:

receive receipt information from a point of sale or self service terminal;

create an image of a receipt using the receipt information, and include the receipt image in a customer bank or account statement.

Preferably, the system has a memory or store for storing a template or form for defining a format or layout for the receipt image.

The template or form may be stored in the self-service or point of sale terminal, and the self-service or point of sale terminal may be operable to send the receipt information in or with the template or form to the host terminal.

Alternatively, the template or form may be stored in the host, and the host may be operable to generate the receipt image by including the receipt information received from the point of sale or self-service terminal in the template or form. In practice, a plurality of templates may be stored at the host terminal and the system may be operable to identify the receipt issuing party; search for the template associated with that party, and create the receipt image using the template found. According to yet another aspect of the present invention, there is provided a self-service or point of sale terminal that includes a receipt image template and is operable to receive transaction information, and send that information to a remote terminal together with or in association with the receipt template.

BRIEF DESCRIPTION OF THE DRAWINGS

Various aspects of the invention will now be described by way of example only, and with reference to the accompanying drawings, of which:

FIG. 4 is a view of a statement that would be provided to the customer.

DETAILED DESCRIPTION

Figure 1:
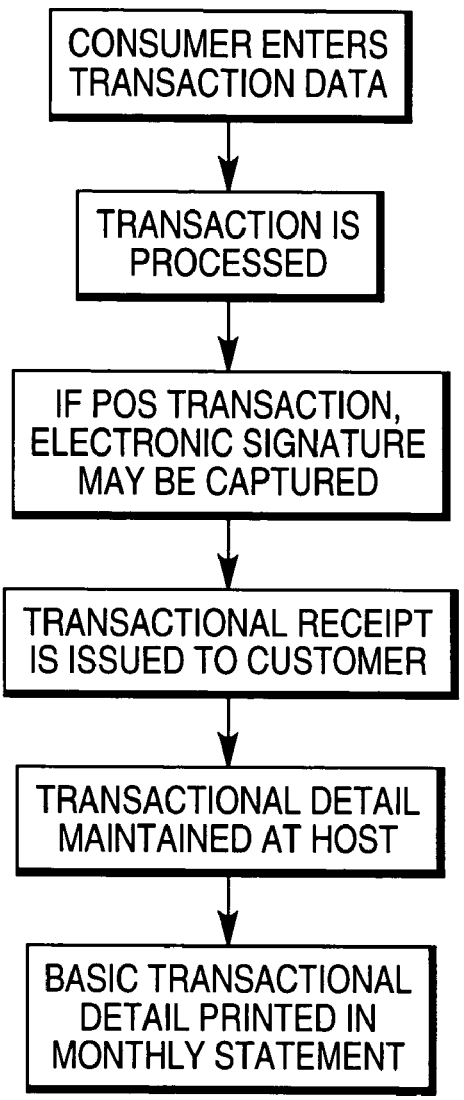
Figure 2:
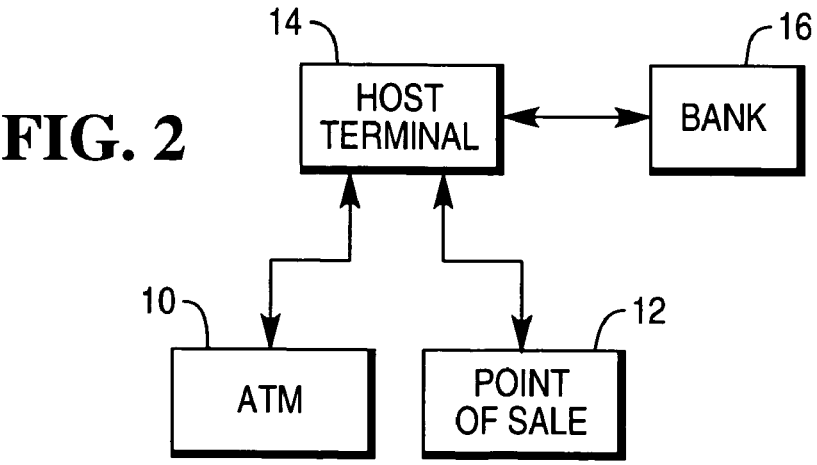
FIG. 2 is a block diagram of a network of ATMs and point of sales terminals.

FIG. 2 shows a network of ATMs 10 and POS terminals 12 that are connected to a host terminal 14 via any suitable communications network. Included in each of the ATMs and POS terminals is a computer-based processor (not shown) for controlling terminal functionality and enabling communication with the host. Likewise, included in the host terminal is a computer-based processor (not shown) for controlling communications and functionality. When financial transactions occur at any one of the ATMs 10 or POS terminals 12, details of these are transmitted to the host terminal 14. If the host terminal 14 is controlled by a specific bank or financial services provider, it may be configured to include transaction details for each transaction associated with individual customers, and use this information to generate bank or account statements for those customers. Otherwise, information is transmitted from the host terminal 14 to a banking system 16 provided by the user's bank, which system 16 is then operable to use the data to generate the statement. Networks of the nature shown in FIG. 2 are well known and so will not be described in detail.

Figure 3:
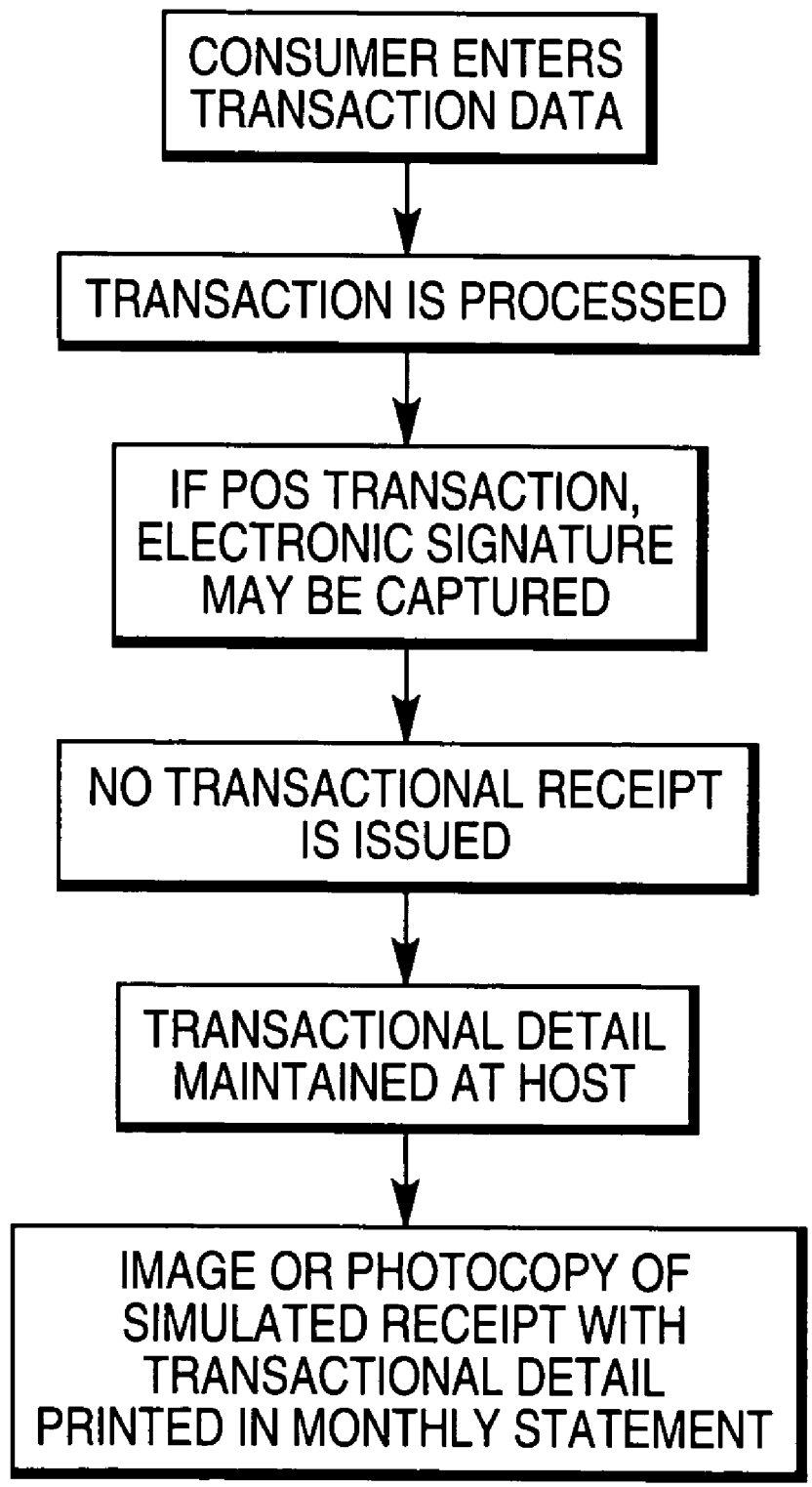
FIG. 3 is a flow diagram of a method for issuing transactional receipts to a customer.

FIG. 3 sets out the steps of a method for providing a customer with transactional receipts. In accordance with the invention, rather than provide receipts at ATMs 10 or POS terminals 12, full receipt information is stored, and presented as part of a customer's monthly bank or credit card statement. More specifically, images of customer receipts are included in their statements. To this end, when a transaction is processed at an ATM 10 or POS terminal 12, instead of issuing a receipt, full details of the transaction are transmitted from the ATM 10 or POS terminal 12 to the host terminal 14, where they are stored for later inclusion in the user's monthly statement. When the monthly statement 18 is to be provided, full details of each transaction are included in a receipt image 20, together with the conventional listing 22 of transactional information, as shown in FIG. 4.

The receipt image 20 may be created and stored as a .jpg or .bmp file or in any other suitable format. Preferably, the receipt image 20 is a copy of the ATM or POS terminal receipt as it would be issued to the consumer at the ATM 10 or POS terminal 12. This could be completed through an electronic form or template. The form or template may be held at the ATM 10 or POS terminal 12 and sent to the host 14 with the user specific transaction information included. This could be done using a software agent that is located within the terminal 10,12. In practice, it is envisaged that holding the form or template at the user terminal 10,12 will be more useful in the POS environment. Alternatively, the form or template could be stored at the host 14 or bank 16, with only the user specific transaction information being transferred from the ATM 10 or POS terminal 12. This would reduce the size of the file moving between the ATM 10 or POS terminal 12 and the host 14. In this case, once the user's transaction data is received at the host 14, it would be included in an appropriate form or template, stored, pasted into a bank statement file and then printed out as a receipt image 20 in the user's monthly statement.

Optionally, the template for each receipt may be defined by the organization that provided the ATM or POS terminal. For example, in the case of a POS in a department store, the receipt may have a format that is defined by that store. As noted before, this format may be defined by a template that is stored at the host terminal for use as and when needed. Of course, where a plurality of receipt issuing parties each has selected a format that is defined by a personalized or customized template, the host terminal would store these different templates, typically in a template database, and when necessary search for and select the appropriate one. Alternatively, the POS terminal 12 may be operable to send the host terminal 14 the receipt information in a format and layout that defines the look and feel of the receipt image. For POS receipts, an electronic image of the customer's signature may be captured and sent to the host terminal, together with other receipt information. In any case, the host terminal 14 or indeed the user's bank 16 uses the information received to create a receipt image 20, which is then included in the customer's monthly statement, together with conventional transactional information, such as date, location and amount. For clarity, the statement 18 is divided into two distinct sections, one for the receipt images 20 and one for the conventional transaction listings 22.

By providing copies of receipts in a customer's monthly statement, the need to print out individual receipts at ATMs or POS terminals can be avoided. This means that environmental problems caused by rubbish can be limited, as can be the need to provide printers in ATMS. This is advantageous.

A skilled person will appreciate that variations of the disclosed arrangements are possible without departing from the invention. For example, the self-service or POS terminals may be operable to allow the user to select to have a receipt issued immediately and/or a receipt to be included in their next bank or account statement. Accordingly the above description of the specific embodiment is made by way of example only and not for the purposes of limitation. It will be clear to the skilled person that minor modifications may be made without significant changes to the operation described.

What is claimed is:

1. A method, comprising:
    a) using an Automated Teller Machine, ATM, to transmit receipt information, which describes transactions undertaken by users of the ATM, to a host terminal which is controlled by a bank and which controls functionality of the ATM;
    b) for each of said transactions, using the host terminal to induce printing of an image (20) of a receipt using respective receipt information which was received by the host terminal, such that the printing comprises adding said image (20) to a paper document (18) which contains transaction listings (22); and
    c) including the receipt images (20), which were added to the paper document, in a monthly paper account statement sent to the users.

2. A method as claimed in claim 1, further comprising defining a format or layout for the receipt image using a template or form.

3. A method as claimed in claim 2, further comprising storing the template or form at the ATM, and sending the receipt information in or with the template to the host terminal.

4. A method as claimed in claim 2, further comprising storing the template or form at the host terminal, and using the receipt information and the template or form to create the receipt image.

5. A method as claimed in claim 4, wherein a plurality of templates are stored at the host terminal.

6. A system for providing a receipt to a user, the system comprising:
    a) an Automated Teller Machine, ATM, which
        i) undertakes a transaction with the user and
        ii) generates receipt information which describes the transaction;
    b) a host which
        i) is controlled by a bank and controls functionality of the ATM ii) receives the receipt information from the ATM;
iii) prints an image of a receipt onto paper using the receipt information; and
iv) causes the receipt image on paper to be included in a monthly customer bank or account statement sent to the user.

7. A system as claimed in claim 6, further comprising a template or form for defining a format or layout for the receipt image.

8. A system as claimed in claim 7, wherein the template or form is stored in the ATM, and the ATM is operable to send the receipt information in or with the template or form to the host terminal.

9. A system as claimed in claim 7, wherein the template or form is stored in the host, and the host is operable to generate the receipt image by including the receipt information received from the ATM in the template or form.

10. A financial system, comprising:
  a) a host computer which is controlled by a bank;
  b) an Automated Teller Machine, ATM, which is controlled by the host computer and which includes
    i) a communication link connecting with the host computer, and
    ii) a receipt image template which describes layout of receipt-type information for a transaction with a customer, which information includes
      A) date of transaction,
      B) amount of transaction,
      C) identity of ATM, and
      D) account number involved in the transaction;
    iii) a computing system which
      A) undertakes a transaction with a user,
      B) creates receipt-type information which describes the transaction, and
      C) transmits the receipt-type information to the host computer, in which financial system the host computer
    A) prints a receipt image onto paper using (1) the receipt-type information and (2) the template, and
    B) includes the receipt image on paper in a monthly paper account statement sent to the customer.

11. An ATM according to claim 10, in which the terminal prints no receipts for customers at any time.

12. An ATM according to claim 10, in which the terminal contains no printer which prints receipts for customers.

13. A method comprising:
  a) using an Automated Teller Machine, ATM, at which a customer carries out an ATM transaction, to generate receipt information associated with the ATM transaction;
  b) using a printer controlled by a bank to print an image of an ATM transactional receipt based upon the receipt information associated with the ATM transaction, such that the image is added to a paper document (18); and
  c) delivering the paper document containing the image of the ATM transactional receipt to the ATM customer, along with a paper monthly bank statement delivered to the customer.

14. ATM according to claim 13, in which the ATM prints no receipts for customers at any time.

15. ATM according to claim 13, in which the ATM contains no printer which prints receipts for customers.

* * * * *